(12) United States Patent
Koreeda et al.

(10) Patent No.: US 6,851,868 B2
(45) Date of Patent: Feb. 8, 2005

(54) OPTICAL CONNECTOR MODULE

(75) Inventors: Yuichi Koreeda, Hachioji (JP); Hiroaki Koshizuka, Gyoda (JP); Ryoji Kaku, Akishima (JP); Takao Mase, Musashimurayama (JP); Takuya Miyashita, Fussa (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 54 days.

(21) Appl. No.: 10/600,268

(22) Filed: Jun. 20, 2003

(65) Prior Publication Data

US 2004/0258366 A1 Dec. 23, 2004

(51) Int. Cl.⁷ ................................................ G02B 6/36
(52) U.S. Cl. ............................ 385/88; 385/89; 385/92
(58) Field of Search ...................... 388/88–90, 92–93; 250/551; 354/135

(56) References Cited

U.S. PATENT DOCUMENTS 5,416,871 A * 5/1995 Takahashi et al. ............ 385/88
6,386,768 B1 * 5/2002 Yoon et al. .................... 385/88

* cited by examiner

Primary Examiner—Dung A. Le
(74) Attorney, Agent, or Firm—Frishauf, Holtz, Goodman & Chick, P.C.

(57) ABSTRACT

There is provided an optical connector module of which an optical transmission/reception wafer and an optical waveguide wafer can be registered with each other easily and accurately without misregistration. An optical transmission/reception wafer has guide pin-receiving V-grooves with a V-shaped cross-section, formed at locations preset in association with an optical transmission/reception end of an optical transmission/reception section. An optical waveguide-side connector has an optical waveguide wafer formed with guide pin-receiving V-grooves in association with the guide pin-receiving V-grooves of the optical transmission/reception wafer. Wafer registration guide pins are inserted in these guide pin-receiving V-grooves, and the optical transmission/reception wafer and the optical waveguide wafer are brought close for interconnection such that these guide pins are tightly sandwiched by the guide pin-receiving grooves.

8 Claims, 5 Drawing Sheets

OPTICAL CONNECTOR MODULE

BACKGROUND OF THE INVENTION

Field of the Inventiom

This invention relates to an optical connector module, and more particularly to an optical connector module for connecting between a transmission/reception source circuit and an optical fiber.

PRIOR ART

Figure 5:
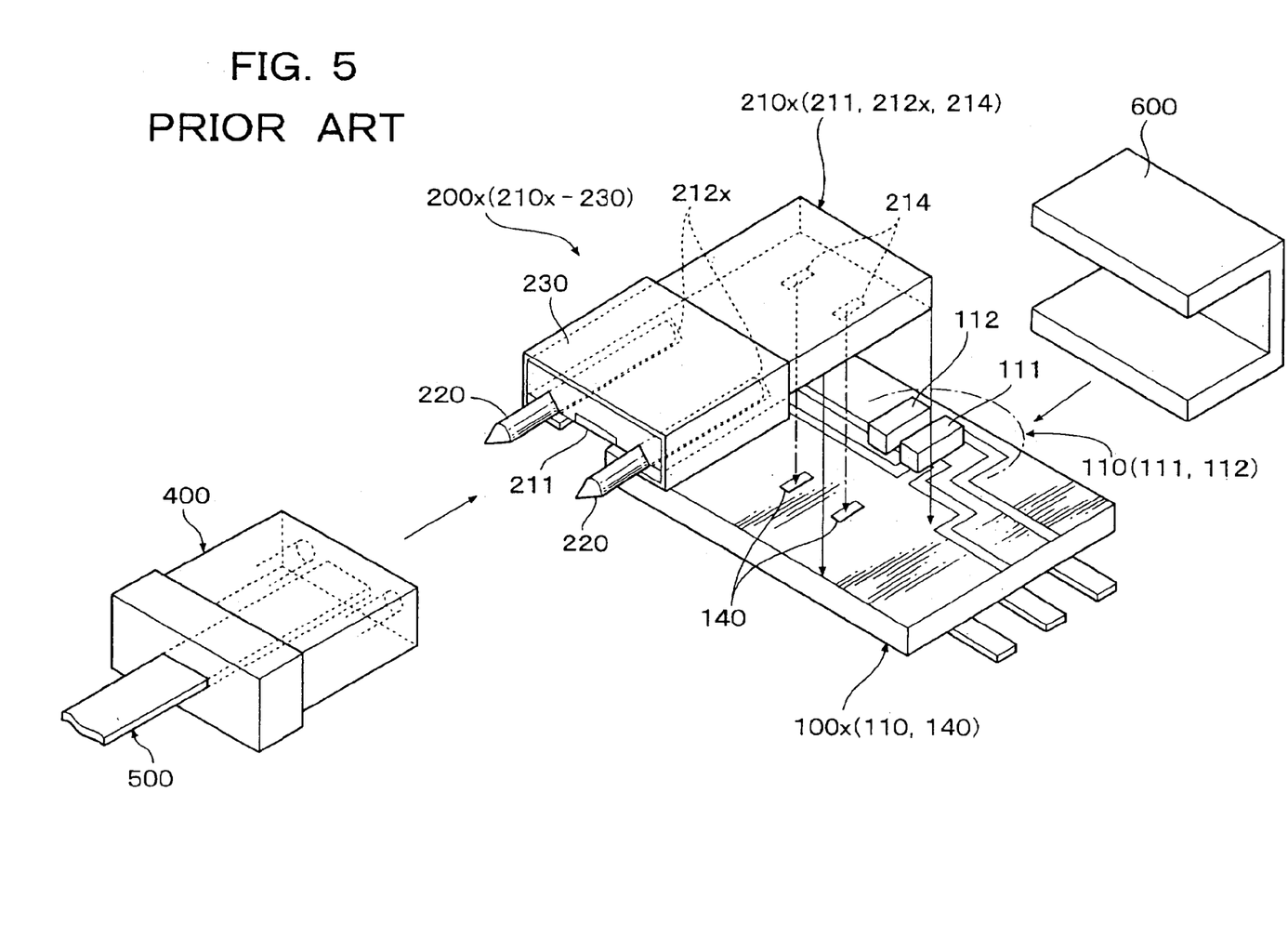
FIG. 5 is an exploded perspective view showing an example of a conventional optical connector module.

When signals are transmitted through an optical fiber, an optical connector module is usually used which has an optical waveguide interposed between a transmission/reception source circuit for transmitting and receiving the signals and the optical fiber. An example of a conventional optical connector module of this kind is illustrated in FIG. 5.

The optical connector module is comprised of an optical transmission/reception wafer 100x, an optical waveguide-side connector 200x, an optical fiber-side connector 400, and a coupling/fixing member for coupling and fixing the optical transmission/reception wafer 100x and the optical waveguide-side connector 200x to each other. Detailed description of these components will be given hereafter.

First, the optical transmission/reception wafer 100x includes an optical transmission/reception section 110 that is formed by arranging a light-emitting device 111., such as a light-emitting diode (LED), a laser diode (LD), or the like, which serves as an optical transmission end, and a light-receiving device 112, such as a photodiode (PD), which serves as an optical reception end, at respective predetermined locations thereof, and to connected to a transmission/reception source circuit, not shown, and markers 140 arranged forward of the optical transmission/reception end of the light-emitting device 111 and the light-receiving device 112.

Next, the optical waveguide-side connector 200x includes an optical waveguide wafer 210x, connector guide pins 220, and a pin-fixing member 230. The optical waveguide wafer 210x is comprised of an optical waveguide 211 having an optical transmission/reception end face thereof disposed on one end face of the optical waveguide wafer 210x, for optical transmission and reception to and from the optical transmission/reception section 110 of the optical transmission/reception wafer 100x, and an optical connection end face thereof disposed on the other end face of the optical waveguide wafer 210x, for optical connection to an optical fiber 500, guide pin-receiving V-grooves 212x with a V-shaped cross-section, formed on both sides of the optical waveguide 211 and toward the other end face of the optical waveguide wafer 210x, and markers 214 provided at respective locations on the both sides of the optical waveguide 211 and toward the one end face of the optical waveguide wafer 210x, which correspond in position to the markers 140 of the 100x. The connector guide pins 220 are arranged and held in the guide pin-receiving V-grooves 212x, respectively, such that they protrude from the other end face of the optical waveguide wafer 210x by a preset length. The pin-fixing member 230 fixes the connector guide pins 220 to the optical waveguide wafer 210z in a state in which the connector guide pins 220 are arranged and held in the guide pin-receiving V-grooves 212x, respectively.

Further, the optical fiber-side connector 400 has the optical fiber 500 disposed and fixedly held therein such that an optical connection end face of the optical fiber 500 is disposed on a connection end face (indicated by broken lines in FIG. 5) of the connector 400 for connection to the optical waveguide-side connector 200x, whereby when the protruding portions of the connector guide pins 220 are inserted into guide pin-Inserting holes (indicated by broken lines in FIG. 5) opening in the above-mentioned connection end face to couple the optical fiber-side connector 400 to the optical waveguide-side connector 200x, the optical fiber 500 to connected to the optical waveguide 211.

Furthermore, the optical waveguide-side connector 200x and the optical transmission/reception wafer 10x are connected to each other by flip chip bonding, in which they are joined through registration of the markers 214 on the underside of the optical waveguide wafer 210x with the markers 140 on the top of the optical transmission/reception wafer 10x. At this time, optical transmission/reception surfaces of the light-emitting device 111 and the light-receiving device 112 of the optical transmission/reception section 110 and the optical transmission/reception end face of the optical waveguide 211 are also registered with each other.

The conventional optical connector module described above is configured such that through registration and joining of the markers 140 formed on the top of the optical transmission/reception wafer 100x and the markers 214 on the underside of the optical waveguide wafer 210x, by flip chip bonding, the optical transmission/reception surfaces of the light-emitting device 111 and the light-receiving device 112 of the optical transmission/reception section 110 and the optical transmission/reception end face of the optical waveguide 211 are positioned with respect to each other. Therefore, the conventional optical connector module suffers the problem of difficulty of registering the markers 140 and 214 with each other, and what to worse, there to a fear of misregistration occurring between the wafers when they are connected to each other.

SUMMARY OF THE INVENTION

It is an object of the present invention to provide an optical connector module which facilitates registration between an optical transmission/reception wafer and an optical waveguide wafer thereof, and prevents misregistration between an optical transmission/reception surface of an optical transmission/reception section and an optical transmission/reception surface of an optical waveguide thereof when the wafers are connected to each other.

To attain the above object, the present invention provides an optical connector module for connecting between a transmission/reception source circuit and an optical fiber, comprising:

an optical transmission/reception wafer including an optical transmission/reception section that to formed such that an optical transmission/reception end thereof is disposed at a predetermined location and is connected to the transmission/reception source circuit, and a first V-groove formed at a location preset in association with the optical transmission/reception end of the optical transmission/reception section such that the first V-groove has a V-shaped cross-section;

an optical waveguide-side connector including an optical waveguide wafer, and a connector guide pin, the optical waveguide wafer including an optical waveguide formed such that the optical waveguide has an optical transmission/reception end face thereof disposed on one end face of the optical waveguide wafer in association with the optical transmission/reception end of the optical transmission/reception section, and an optical connection end face thereof disposed on the other end face of the optical waveguide wafer, and that the optical waveguide provides optical connection between the optical transmission/reception end face and the optical connection end face, and a second V-groove formed in the optical waveguide wafer at a location corresponding in position to the first V-groove of the optical transmission/reception wafer, such that the second V-groove has a V-shaped cross-section, the connector guide pin being fixedly held in the optical waveguide wafer such that the connector guide pin protrudes from the other nd face of the optical waveguide wafer by a preset length;

an wafer registration guide pin inserted between the first V-groove of the optical transmission/reception wafer and the second V-groove of the optical waveguide wafer, and sandwiched by the first V-groove of the optical transmission/reception wafer and the second V-groove of the optical waveguide wafer, for positioning and fixing the wafers, when the wafers are brought close to each other for interconnection, thereby registering the optical transmission/reception end of the optical transmission/reception section and the optical transmission/reception end face of the optical waveguide, of the wafers, with each other;

a wafer interconnecting/fixing member for connecting and fixedly holding the optical transmission/reception wafer and the optical waveguide wafer; and an optical fiber-side connector for fixedly holding the optical fiber such that an optical connection end face of the optical fiber is disposed on one end face thereof, the optical fiber-side connector having a guide pin-inserting hole formed at a location corresponding in position to the connector guide pin of the optical waveguide-side connector, the optical fiber-side connector being connected to the optical waveguide-side connector by inserting the connector guide pin into the guide pin-inserting hole, thereby connecting the optical connection end face of the optical fiber to the optical connection end face of the optical waveguide.

According to this optical connector module, the wafer registration guide pin is inserted into the associated first and second V-grooves of the optical transmission/reception wafer and the optical waveguide wafer, and the wafers are brought close to each other for interconnection and held in a manner fixed to each other. Through these very simple and easy operations, it is possible to accurately register the optical transmission/reception end face of the optical waveguide and the optical transmission/reception end of the optical transmission/reception section with each other, and prevent misregistration when the wafers are connected to each other.

Preferably, the second V-groove of the optical waveguide-side connector comprises a connector guide pin-receiving V-groove formed in the optical waveguide wafer, for receiving the connector guide pin to fixedly hold the connector guide pin therein, and a wafer registration guide pin receiving V-groove formed in the optical waveguide wafer at a location along an extension line from the connector guide pin-receiving V-groove, integrally with the connector guide pin-receiving V-groove, for receiving the wafer registration guide pin to fixedly hold the wafer registration guide pin therein.

More preferably, the connector guide pin of the optical waveguide-side connector and the wafer registration guide pin are integrally formed with each other, and disposed and fixedly held in the second V-groove of the optical waveguide wafer.

Preferably, the optical transmission/reception wafer has a first orthogonal V-groove formed in a direction orthogonal to the first V-groove, for wafer registration, and the optical waveguide-side connector has a second orthogonal V-groove formed therein at a location corresponding in position to the first orthogonal V-groove of the optical transmission/reception wafer, for wafer registration, the wafer registration guide pin comprising a first wafer registration guide pin sandwiched between the first V-groove and the second V-groove, and a second wafer registration guide pin sandwiched between the first orthogonal V-groove and the second orthogonal V-groove.

More preferably, the optical transmission/reception wafer has a first orthogonal V-groove formed in a direction orthogonal to the first V-groove, for wafer registration, and the optical waveguide-side connector has a second orthogonal V-groove formed therein at a location corresponding in position to the first orthogonal V-groove of the optical transmission/reception wafer, for wafer registration, the wafer registration guide pin comprising a first wafer registration guide pin sandwiched between the first V-groove and the wafer registration guide pin-receiving V-groove, and a second wafer registration guide pin sandwiched between the first orthogonal V-groove and the second orthogonal V-groove.

More preferably, the first wafer registration guide pin and the second wafer registration guide pin are configured to have different diameters, and the first and second V-grooves and the first and second orthogonal V-grooves are configured to have different dimensions according to the respective different diameters of the first wafer registration guide pin and the second wafer registration guide pin.

Preferably, the second V-groove comprises two second V-grooves formed on both sides of the optical waveguide first V-groove, respectively, the first V-groove comprising two first V-grooves formed in association with the two second V-grooves, respectively, the connector guide pin comprising two connector guide pins, and the wafer registration guide pin comprising two wafer registration guide pins.

The above and other objects, features and advantages of the present invention will become more apparent from the following detailed description taken in conjunction with the accompanying drawings.

DETAILED DESCRIPTION OF THE PREFERRED EMBODIMENTS

Next, the present invention will now be described in detail with reference to drawings showing preferred embodiments thereof.

Figure 1:
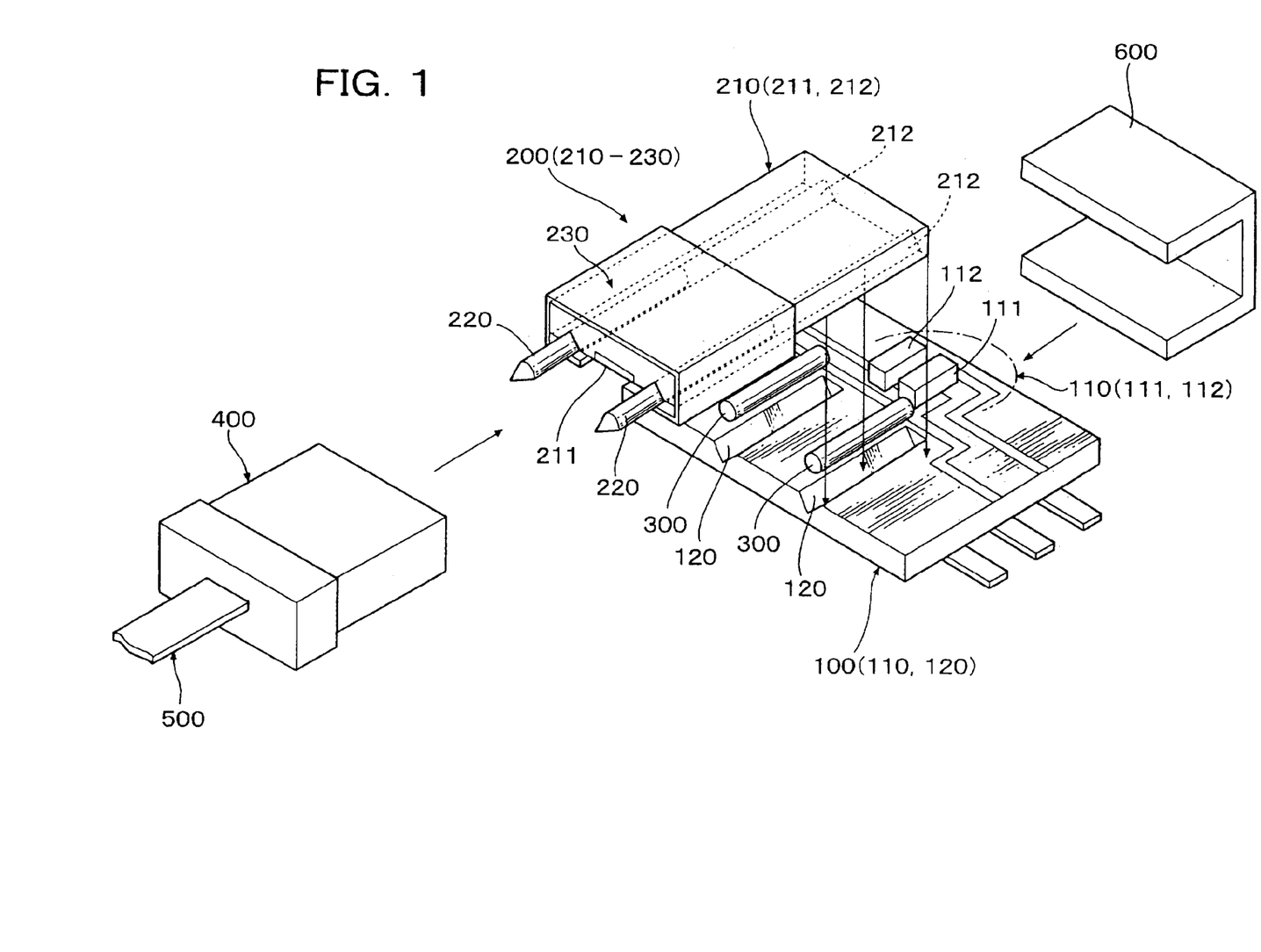
FIG. 1 is an exploded perspective view of an optical connector module according to a first embodiment of the present invention.

FIG. 1 is an exploded perspective view of an optical connector module according to a first embodiment of the present invention. The optical connector module according to the first embodiment is comprised of an optical transmission/reception wafer 100, an optical waveguide-side connector 200, wafer registration guide pins 300, an optical fiber-side connector 400, and a wafer interconnecting/fixing member 600. Details of these components will be described hereinafter.

First, the optical transmission/reception wafer 100 includes an optical transmission/reception section 110 that is formed by arranging a light-emitting device 111, such as a light-emitting diode (LED), a laser diode (LD), or the like, which serves as an optical transmission end, and a light-receiving device 112, such as a photodiode (PD), which serves as an optical reception end, at respective predetermined locations thereof, and is connected to a transmission/reception source circuit, not shown, and two guide pin-receiving V-grooves 120 with a V-shaped cross-section, formed in opposite side portions of the optical transmission/reception section 110, at respective locations forward of an optical transmission/reception end of the light-emitting device 111 and the light-receiving device 112.

Next, the optical waveguide-side connector 200 is comprised of an optical waveguide wafer 210, connector guide pins 220, and a pin-filing member 230. The optical waveguide wafer 210 includes an optical waveguide 211 having an optical transmission/reception end face thereof disposed on one end face of the optical waveguide wafer 210 in association with the optical transmission/reception end of the optical transmission/reception section 110, for optical transmission/reception to and from the optical transmission/reception section 110, and an optical connection end face thereof disposed on the other end face of the optical waveguide wafer 210, for optical connection to an optical fiber 500, such that the optical waveguide 211 provides optical connection between the optical transmission/reception end face and the optical connection end face, and guide pin-receiving V-grooves 212 with a V-shaped cross-section, formed in respective portions of the optical waveguide wafer 210 along opposite sides of the optical waveguide 211, which correspond in position to the guide pin receiving V-grooves 120 of the optical transmission/reception wafer 100, and in respective portions of optical waveguide wafer 210 along extension lines from the portions corresponding in position to the guide pin-receiving V-grooves 120. The connector guide pins 220 are received in respective portions of the guide pin-receiving V-grooves 212, toward the other end face of the optical waveguide wafer 210, such that they protrude from the other end face of the optical waveguide wafer 210 by a preset length. The pin-fixing member 230 fixedly holds the connector guide pins 220 in the optical waveguide wafer 210 in a state in which the connector guide pins 220 are received in the guide pin-receiving V-grooves 212, respectively.

Next, the wafer registration guide pins 300 are inserted between the guide pin-receiving V-grooves 120 of the optical transmission/reception wafer 100, and portions of the guide pin-receiving V-grooves 212 of the optical waveguide wafer 210, corresponding in position to the guide pin-receiving V-grooves 120 and when the optical transmission/reception wafer 100 and the optical waveguide wafer 210 are brought close to each other for interconnection, the wafer registration guide pins 300 are sandwiched by the guide pin-receiving V-grooves 120, 212 of these wafers (100, 210), for positioning and fixing of the wafers (100, 210), thereby effecting registration between the optical transmission/reception end of the optical transmission/reception section 110 of the wafer 100, and the optical transmission/reception end face of the optical waveguide 211 of the wafer 210.

The optical fiber-side connector 400 has same construction as that of the optical fiber-side connector 400 of the prior art described above. The protruding portions of the connector guide pins 220 of the optical waveguide-side connector 200 are inserted into guide pin-inserting holes of the optical fiber-side connector 400 whereby the optical waveguide-side connector 200 and the optical fiber-side connector 400 are coupled with ach other, to thereby connect the optical connection end face of the optical fiber 500 to the optical connection end face of the optical waveguide 211.

It should be noted that the wafer interconnecting/fixing member 600 brings the optical transmission/reception wafer 100 and the optical waveguide wafer 210 close to each other for interconnection and holding them in a manner fixed to each other.

In the first embodiment, the wafer registration guide pins 300 have such a diameter that enables the guide pins 300 to be tightly sandwiched by the guide pin-receiving V-grooves 120, 212 of the optical transmission/reception wafer 100 and the optical waveguide wafer 210, when the wafers 100 and 210 are brought close to each other for interconnection. Therefore, when the optical transmission/reception wafer 100 and the optical waveguide wafer 210 are brought close and bonded to each other to thereby sandwich the guide pins 300 by the V-grooves (120, 212), the relative position of the wafers (100, 210) is uniquely determined with respect to a direction orthogonal to the central axes of the wafer registration guide pins 300.

Therefore, if the positions and dimensions of the guide pin-receiving V-grooves 120, 212, and the dimension and the like of the wafer registration guide pins 300 are geometrically determined such that the optical transmission/reception nd face of th optical transmission/reception section 110 and that of the optical waveguide 211 are positioned to respective locations opposed to each other, the positional relationship between the optical transmission/reception wafer 100 and the optical waveguide wafer 210 is uniquely determined simply by bringing the wafers close to each other for interconnection, whereby it is possible to accurately register the optical transmission/reception end of the optical transmission/reception section 110 and the optical transmission/reception end face of the optical waveguide 211 with each other.

More specifically, in the above first embodiment, the wafer registration guide pins 300 are inserted respectively between the guide pin-receiving V-grooves 120 of the optical transmission/reception wafer 100 and the guide pin-receiving V-grooves 212 of the optical waveguide wafer 210, and these wafers (100, 210) are brought close for interconnection and held in a manner fixed to each other. Through these very simple and easy operations, it is possible to accurately register the optical transmission/reception end of the optical transmission/reception section 110 and the optical transmission/reception end face of the optical waveguide 211 with each other, and what is more, misregistration of the wafers cannot occur when they are connected to each other.

Figure 2:
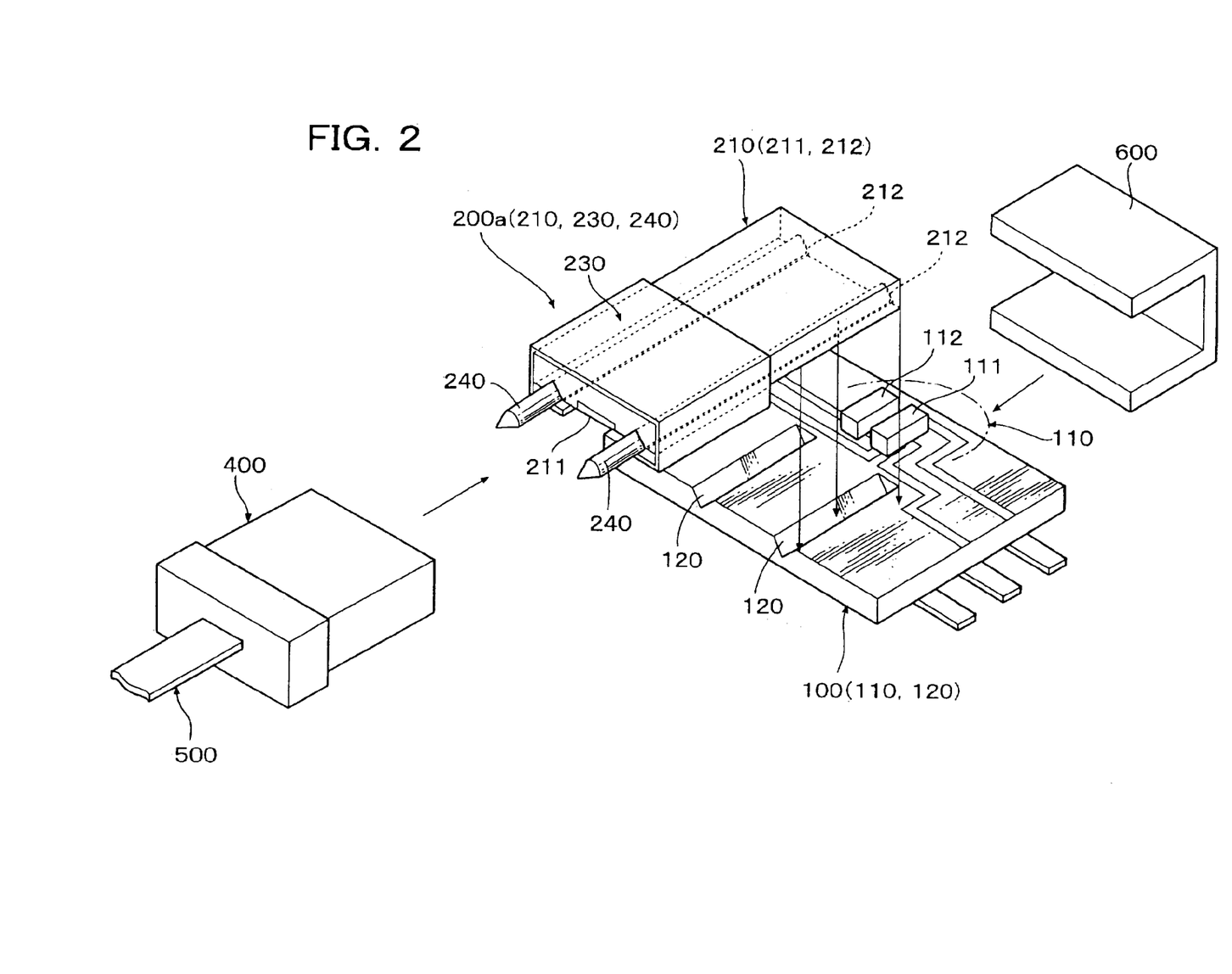
FIG. 2 is an exploded perspective view of an optical connector module according to a second embodiment of the present invention.

FIG. 2 is an exploded perspective view of an optical connector module according to a second embodiment of the present invention.

The second embodiment is distinguished from the first embodiment described above in that the connector guide pins 220, of the optical waveguide-side connector 200 and the wafer registration guide pins 300 in the first embodiment are integrally formed with each other to form guide pins 240, respectively, and the guide pins 240 are received in guide pin-receiving V-grooves 212 of an optical waveguide wafer 210, with connector guide pin-corresponding portions of the guide pins 240 being fixedly held by a pin-fixing member 230, thus forming an optical waveguide-side connector 200a.

According to the second embodiment, since each connector guide pin and each wafer registration guide pin are integrally formed with each other and contained in the optical waveguide-side connector 200a, there is no need to handle the wafer registration guide pins as single separate elements as in the case of the first embodiment, and therefore has the advantage of simplified and facilitated operation of interconnecting the optical transmission/reception wafer 100 and the optical waveguide wafer 210. It should be noted that the other advantageous effects provided by the second embodiment are the same as those obtained by the first embodiment.

Figure 3:
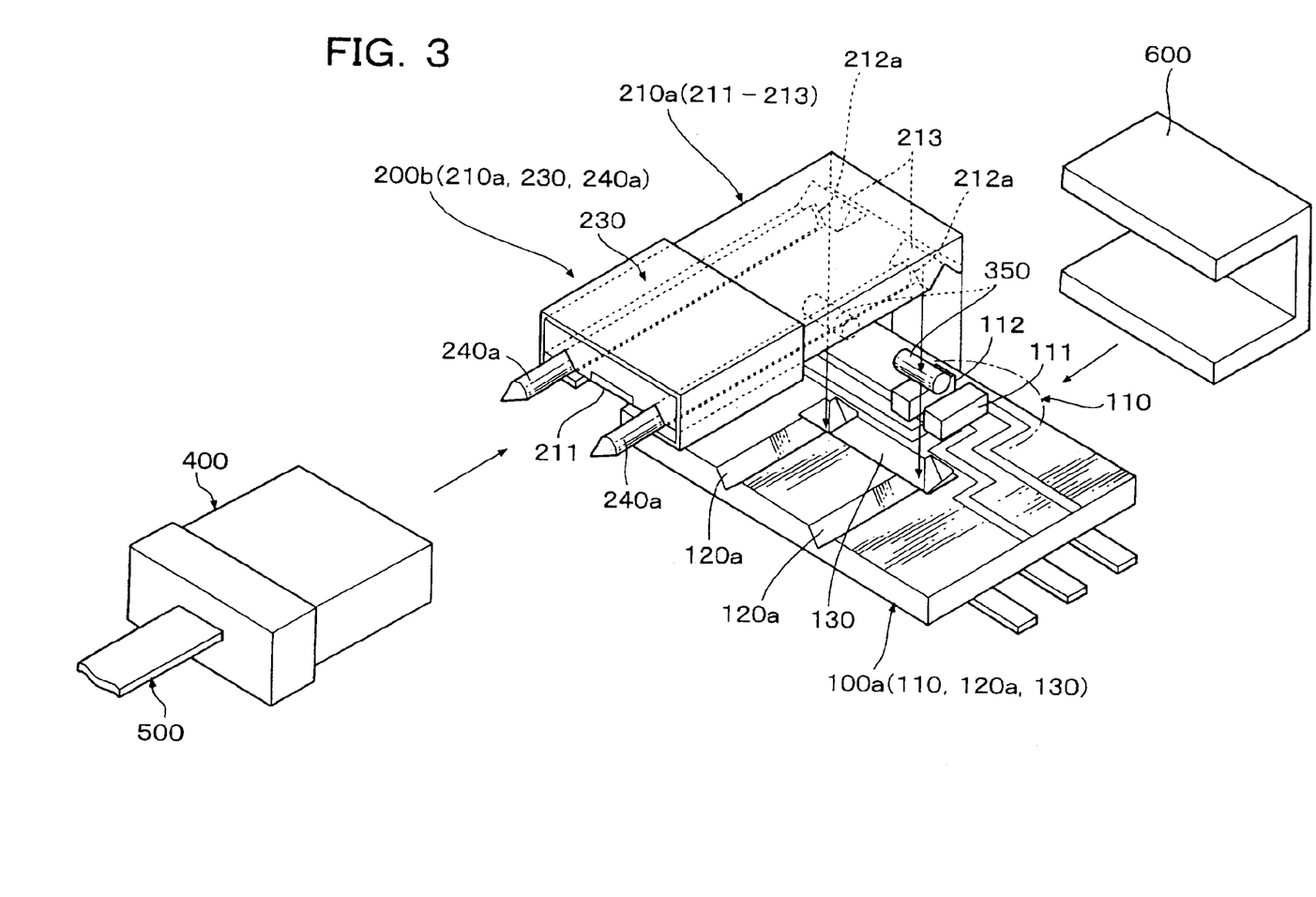
FIG. 3 is an exploded perspective view of an optical connector module according to a third embodiment of the present invention.

FIG. 3 to an exploded perspective view of an optical connector module according to a third embodiment of the present invention.

This embodiment is distinguished from the above second embodiment in which the guide pins 240 and the guide pin-receiving V-grooves 120, 212 for sandwiching the guide pins 240 are arranged along opposite sides of the optical waveguide 211', in that there are provided not only guide pins 240a disposed along opposite sides of an optical waveguide 211, and guide pin-receiving V-grooves 120a, 212a for sandwiching the guide pins 240a, but also guide pin-receiving V-grooves 130, 213 which are formed orthogonal to the guide pin-receiving V-grooves 120a, 212a, thus forming an optical transmission/reception wafer 100a and an optical waveguide wafer 210a, with an additional member of an wafer registration guide pin 350 for being sandwiched by the guide pin-receiving V-grooves 130, 213.

The above arrangement and configuration provides the advantageous effects of being capable of uniquely controlling not only mutual positions of an optical transmission/reception end of an optical transmission/reception section 110 and an optical transmission/reception end face of the optical waveguide 211, with respect to the optical axes, but also the distance between the end faces and the abutted state thereof, and thereby controlling the connected state of the end faces.

It should be noted that the other advantageous effects provided by the third embodiment are the same as those obtained by the second embodiment.

Figure 4:
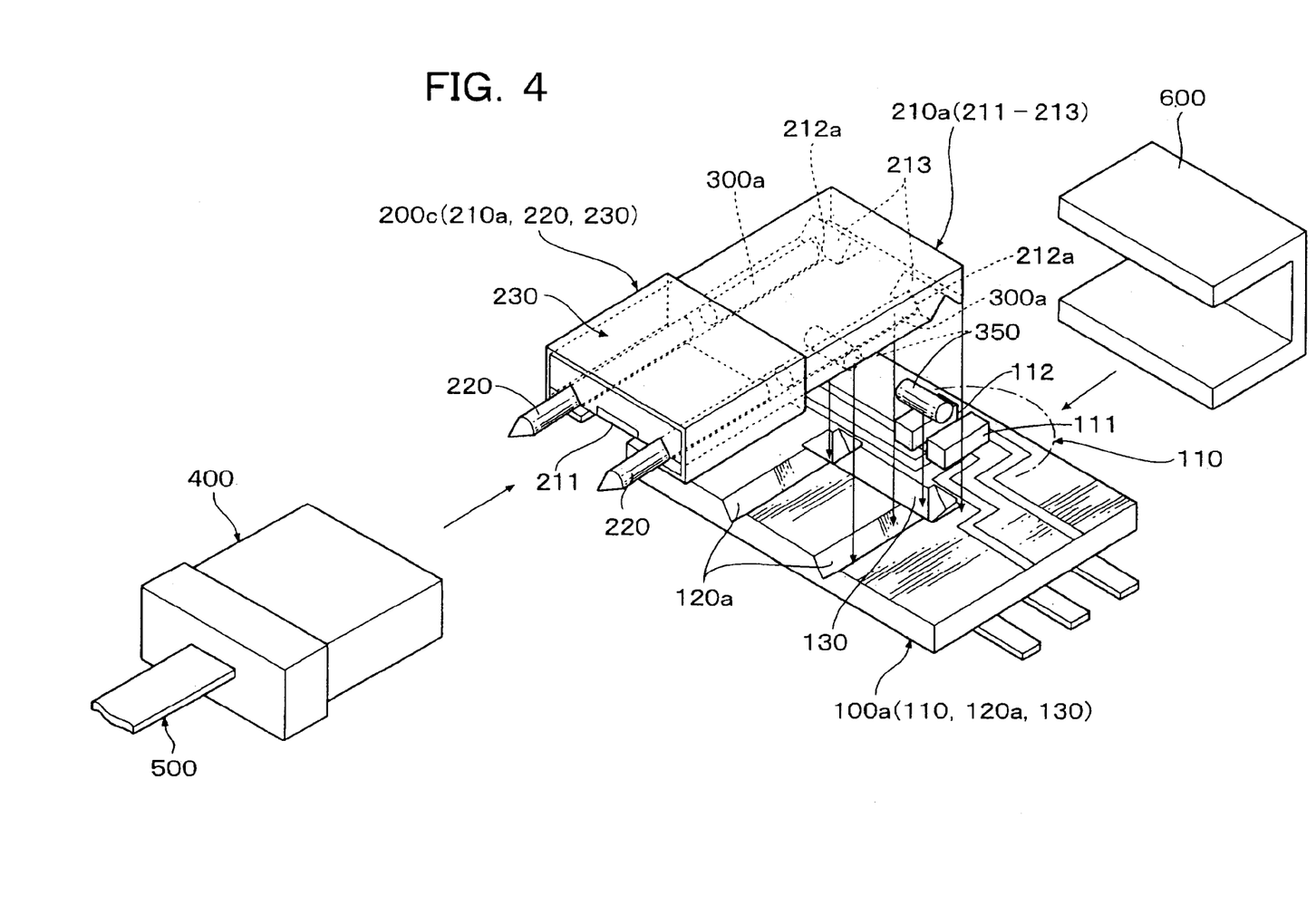
FIG. 4 is an exploded perspective view of an optical connector module according to a fourth embodiment of the present invention.

FIG. 4 is an exploded perspective view of an optical connector module according to a fourth embodiment of the present invention.

In the fourth embodiment, the integrally-formed guide pins 240a in the third embodiment are divided into connector guide pins 220 and wafer registration guide pins 300a, as in the first embodiment. The arrangement and configuration make it possible to use the wafer registration guide pins 300a having a diameter different from that of the connector guide pins 220, which provides the advantages effect of being capable of controlling registration accuracy, wafer interconnection accuracy, and so forth.

Further, similarly, it is also possible to control registration accuracy, wafer interconnection accuracy, and so forth, based on a diameter of the wafer registration guide pin 350 orthogonal to the wafer registration guide pins 300a. The other advantageous effects provided by the fourth embodiment are the same as those obtained by the third embodiment.

It is further understood by those skilled in the art that the foregoing are the preferred embodiments of the present invention, and that various changes and modification may be made thereto without departing from the spirit and scope thereof.

What is claimed is:

1. An optical connector module for connecting between a transmission/reception source circuit and an optical fiber comprising:

an optical transmission/reception wafer including an optical transmission/reception section that is formed such that an optical transmission/reception end thereof is disposed at a predetermined location and is connected to the transmission/reception source circuit, and a first V-groove formed at a location preset in association with said optical transmission/reception end of said optical transmission/reception section such that said first V-groove has a V-shaped cross-section;

an optical waveguide-side connector including an optical waveguide wafer, and a connector guide pin, said optical waveguide wafer including an optical waveguide formed such that said optical waveguide has an optical transmission/reception end face thereof disposed on one end face of said optical waveguide wafer in association with said optical transmission/reception end of said optical transmission/reception section, and an optical connection end face thereof disposed on the other end face of said optical waveguide wafer, and that said optical waveguide provides optical connection between said optical transmission/reception end face and said optical connection end face, and a second V-groove formed in said optical waveguide wafer at a location corresponding in position to said first V-groove of said optical transmission/reception wafer, such that said second V-groove has a V-shaped cross-section, said connector guide pin being fixedly held in said optical waveguide wafer such that said connector guide pin protrudes from the other end face of said optical waveguide wafer by a preset length;

an wafer registration guide pin inserted between said first V-groove of said optical transmission/reception wafer and said second V-groove of said optical waveguide wafer, and sandwiched by said first V-groove of said optical transmission/reception wafer and said second V-groove of said optical waveguide wafer, for positioning and fixing said wafers, when said wafers are brought close to each other for interconnection, thereby registering said optical transmission/reception end of said optical transmission/reception section and said optical transmission/reception end face of said optical waveguide, of said wafers, with each other;

a wafer interconnecting/fixing member for connecting and fixedly holding said optical transmission/reception wafer and said optical waveguide wafer; and an optical fiber-side connector for fixedly holding said optical fiber such that an optical connection end face of said optical fiber is disposed on one end face thereof, said optical fiber-side connector having a guide pin-inserting-hole formed at a location corresponding in position to said connector guide pin of said optical waveguide-side connector, said optical fiber-side connector being connected to said optical waveguide-side connector by inserting said connector guid pin into said guide pin-inserting hole, thereby connecting said optical connection end face of said optical fiber to said optical connection end face of said optical waveguide.

2. An optical connector module according to claim 1, wherein said second V-groove of said optical waveguide-side connector comprises a connector guide pin-receiving V-groove formed in said optical waveguide wafer for receiving said connector guide pin to fixedly hold said connector guide pin therein, and a wafer registration guide pin-receiving V-groove formed in said optical waveguide wafer at a location along an extension line from said connector guide pin-receiving V-groove, integrally with said connector guide pin-receiving V-groove, for receiving said wafer registration guide pin to fixedly hold said wafer registration guide pin therein.

3. An optical connector module according to claim 2, wherein said connector guide pin of said optical waveguide-side connector and said wafer registration guide pin are integrally formed with each other, and disposed and fixedly held in said second V-groove of said optical waveguide wafer.

4. An optical connector module according to claim 1, wherein said optical transmission/reception wafer has a first orthogonal V-groove formed in a direction orthogonal to said first V-groove, for wafer registration, and said optical waveguide-side connector has a second orthogonal V-groove formed therein at a location corresponding in position to said first orthogonal V-groove of said optical transmission/reception wafer, for wafer registration, and wherein said wafer registration guide pin comprises a first wafer registration guide pin sandwiched between said first V-groove and said second V-groove, and a second wafer registration guide pin sandwiched between said first orthogonal V-groove and said second orthogonal V-groove.

5. An optical connector module according to claim 2, wherein said optical transmission/reception wafer has a first orthogonal V-groove formed in a direction orthogonal to said first V-groove, for wafer registration, and said optical waveguide-side connector has a second orthogonal V-groove formed therein at a location corresponding in position to said first orthogonal V-groove of said optical transmission/reception wafer, for wafer registration, and wherein said wafer registration guide pin comprises a first wafer registration guide pin sandwiched between said first V-groove and said wafer registration guide pin-receiving V-groove, and a second wafer registration guide pin sandwiched between said first orthogonal V-groove and said second orthogonal V-groove.

6. An optical connector module according to claim 5, wherein said connector guide pin of said optical waveguide-side connector and said wafer registration guide pin are integrally formed with each other, and disposed and fixedly held in said second V-groove of said optical waveguide wafer.

7. An optical connector module according to claim 5, wherein said first wafer registration guide pin and said second wafer registration guide pin are configured to have different diameters, and said first and second V-grooves and said first and second orthogonal V-grooves are configured to have different dimensions according to the respective different diameters of said first wafer registration guide pin and said second wafer registration guide pin.

8. An optical connector module according to claim 1, wherein said second V-groove comprises two second V-grooves formed on both sides of said optical waveguide first V-groove, respectively, said first V-groove comprising two first V-grooves formed in association with said two second V-grooves, respectively, said connector guide pin comprising two connector guide pins, and said wafer registration guide pin comprising two wafer registration guide pins.

* * * * *